(12) United States Patent (10) Patent No.: US 12,305,691 B2
Luo et al. (45) Date of Patent: May 20, 2025

(54) SUCTION CUP AIR CONTROL SYSTEM AND PHOTOGRAPHY DEVICE

(71) Applicant: TILTA INC., Burbank, CA (US)

(72) Inventors: Yaolong Luo, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/459,288

(22) Filed: Aug. 31, 2023

(65) Prior Publication Data

US 2024/0401636 A1 Dec. 5, 2024

(51) Int. Cl.
*F16B 47/00* (2006.01)
*G03B 17/56* (2021.01)
*F04B 49/06* (2006.01)
*F04B 49/22* (2006.01)

(52) U.S. Cl.
CPC ............ *F16B 47/00* (2013.01); *G03B 17/561* (2013.01); *F04B 49/06* (2013.01); *F04B 49/22* (2013.01)

(58) Field of Classification Search
CPC ..... F16B 47/00; F16B 2200/83; G03B 17/561
USPC ............. 248/363, 205.5, 205.8, 206.2, 206.3
See application file for complete search history.

(56) References Cited

U.S. PATENT DOCUMENTS

| | | | | |
|---|---|---|---|---|
| 3,970,341 | A * | 7/1976 | Glanemann | B66C 1/0293 294/186 |
| 5,516,019 | A * | 5/1996 | Moon | B60R 9/058 248/205.8 |
| 10,030,690 | B2 * | 7/2018 | Liu | G08B 5/22 |
| 11,346,389 | B2 * | 5/2022 | Chen | F16B 47/00 |
| 11,845,181 | B1 * | 12/2023 | Atamer | B25J 15/0052 |
| 11,988,245 | B1 * | 5/2024 | Lin | F16B 47/006 |
| 12,078,257 | B2 * | 9/2024 | Zimmerman | F16B 47/00 |
| 2004/0211867 | A1 * | 10/2004 | Doyle | F16B 47/00 248/205.5 |
| 2006/0231705 | A1 * | 10/2006 | Liu | F16B 47/00 248/205.5 |
| 2007/0023594 | A1 * | 2/2007 | Choi | F16B 47/00 248/205.5 |
| 2014/0084118 | A1 * | 3/2014 | Tooley | F16B 11/00 248/205.3 |
| 2014/0197288 | A1 * | 7/2014 | Yang | F16B 47/006 248/205.9 |
| 2015/0078737 | A1 * | 3/2015 | Albonico | G03B 19/026 396/48 |

(Continued)

*Primary Examiner* — Muhammad Ijaz
(74) *Attorney, Agent, or Firm* — LOZA & LOZA LLP; Derek Yeung

(57) ABSTRACT

A suction cup air control system includes a suction cup body and an air control system for regulating the suction capability of the suction cup body. The air control system is connected to the suction cup body and consists of a high-pressure vacuum cylinder for controlling the suction of the suction cup body and a control pump for extracting and expelling air from the high-pressure vacuum cylinder. The high-pressure vacuum cylinder is linked to the suction cup body, while the control pump is connected to the high-pressure vacuum cylinder. The present disclosure utilizes the high-pressure vacuum cylinder and control pump to extract air from the suction cup body, resulting in faster vacuum suction, thereby ensuring immediate adsorption and stable installation of the suction cup.

11 Claims, 6 Drawing Sheets

(56) References Cited

U.S. PATENT DOCUMENTS

| | | | |
|---|---|---|---|
| 2015/0275943 A1* | 10/2015 | Chang | F16M 13/022 |
| | | | 248/205.8 |
| 2015/0306622 A1* | 10/2015 | Ashworth | F16M 13/022 |
| | | | 248/205.8 |
| 2019/0168396 A1* | 6/2019 | Leidenfrost | B25J 9/1697 |
| 2021/0181609 A1* | 6/2021 | Grinnell | G03B 17/566 |
| 2021/0341011 A1* | 11/2021 | Brenner | F16B 45/00 |
| 2022/0025921 A1* | 1/2022 | Nair | B64G 1/60 |
| 2022/0170503 A1* | 6/2022 | Bleckat | F16B 47/00 |
| 2022/0186770 A1* | 6/2022 | Zhu | F16B 21/09 |
| 2024/0091960 A1* | 3/2024 | Liao | F16B 47/00 |
| 2024/0102510 A1* | 3/2024 | Woo | F16B 47/00 |

\* cited by examiner

SUCTION CUP AIR CONTROL SYSTEM AND PHOTOGRAPHY DEVICE

CROSS-REFERENCE TO RELATED APPLICATIONS

The present Application for Patent claims priority to and the benefit of pending Chinese Patent Application No. 202321351240.7, filed May 30, 2023, and hereby expressly incorporated by reference herein as if fully set forth below in its entirety and for all applicable purposes.

TECHNICAL FIELD

The present disclosure relates to the technical field of suction devices, in particular to a suction cup air control system and a photography device using the suction cup air control system.

INTRODUCTION

In the realm of photography equipment, there is often a need to securely mount cameras in unconventional positions, such as on vehicles, walls, or other non-horizontal surfaces, when capturing special shots. Vacuum suction cups are commonly employed for this purpose. However, traditional suction cups suffer from slow vacuum releasing processes, which can lead to loosening and compromised installation stability.

A previous patent application (Chinese application number: CN201620068501.8) disclosed a self-suction fixed suction cup. It finds wide application in film and television production or wedding photography for securing filming equipment, and the construction industry for handling glass or the link. The structure encompasses a suction cup, a vacuum pump, a housing attached to the suction cup's top, and a sealed enclosure within the housing containing a power switch, a battery, a control circuit board, a negative pressure sensor, and a vacuum pump. Nevertheless, this suction cup exhibits slow vacuuming and a propensity for loosening, resulting in inadequate installation stability.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

To address the aforementioned issues, an objective of the present disclosure is to provide a suction cup air control system that achieves faster vacuuming and ensures installation stability of the suction cup.

Another objective of the present disclosure is to furnish a photography device equipped with the suction cup air control system, thereby achieving faster vacuuming, and ensuring installation stability of the photography device.

To accomplish these objectives, the technical solution presented by the present disclosure is as follows.

The suction cup air control system comprises a high-pressure vacuum cylinder that expedites the extraction of air from the suction cup body, facilitating rapid installation and adsorption onto the mounting surface. The system also integrates a control pump connected to the high-pressure vacuum cylinder, responsible for air extraction and discharge, thus ensuring proper operation of the high-pressure vacuum cylinder.

Furthermore, the air control system may incorporate a detection module to monitor the air pressure within the suction cup body, enabling precise control of the suction cup body's pressure and enhancing installation stability.

Furthermore, the detection module can monitor the air pressure within the high-pressure vacuum cylinder, allowing for accurate control of the air pressure and normal operation of the cylinder.

Furthermore, the control pump can be connected to both the high-pressure vacuum cylinder and the suction cup body, regulating the internal pressure of the suction cup body together.

The photography device encompasses a photography device body and the aforementioned suction cup air control system. Leveraging the high-pressure vacuum cylinder, control pump, and suction cup body, the photography device can be promptly mounted and firmly adhered to external surfaces like vehicles or walls.

In the present disclosure, the utilization of a high-pressure vacuum cylinder and control pump enables accelerated vacuuming of the suction cup body, ensuring immediate adsorption and steadfast installation stability.

In the present disclosure, the photographic device is composed by mounting the main body of the photographic device on the suction cup air control system. By utilizing the rapid vacuuming capability of the system, the photographic device can be quickly installed and adhered to external surfaces such as vehicles or walls. The configuration allows for instant adsorption and ensures the stability of the photographic device installation.

BRIEF DESCRIPTION OF THE DRAWINGS

In order to more clearly illustrate aspects of the present disclosure or the technical schemes in the prior art, the drawings used in the description of exemplary embodiments will be briefly introduced below. Obviously, the drawings in the following description are only examples of the present disclosure. For those ordinarily skilled in the art, other implementations can be obtained according to the structures shown in these drawings.

DETAILED DESCRIPTION

To further elucidate the purpose, technical solution, and features of the present disclosure, exemplary embodiments will be described in detail below, in conjunction with the accompanying drawings. It should be understood that these exemplary embodiments are solely intended to illustrate the present disclosure, and not to limit its scope.

In the present embodiment, a suction cup air control system is disclosed.

Figure 1:
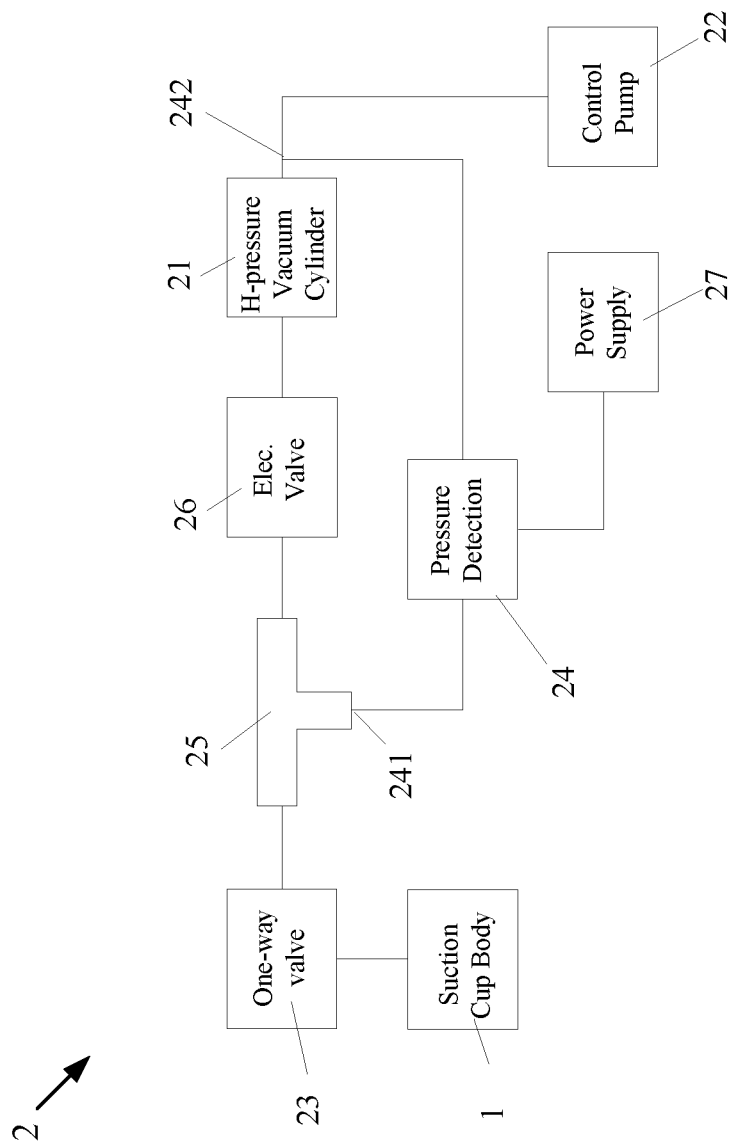
FIG. 1 is a diagram of a suction cup air control system according to a first embodiment of the present disclosure.
Figure 2:
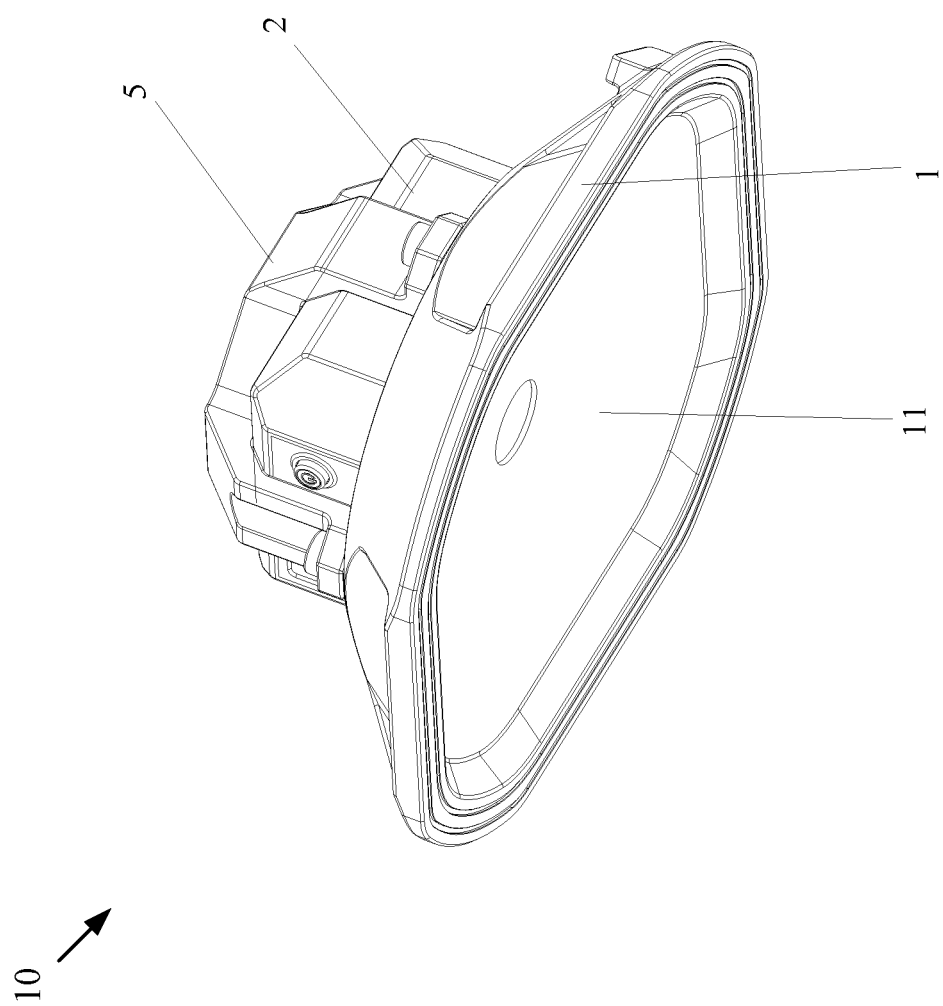
FIG. 2 is a first perspective view of the suction cup air control system of the first embodiment.
Figure 3:
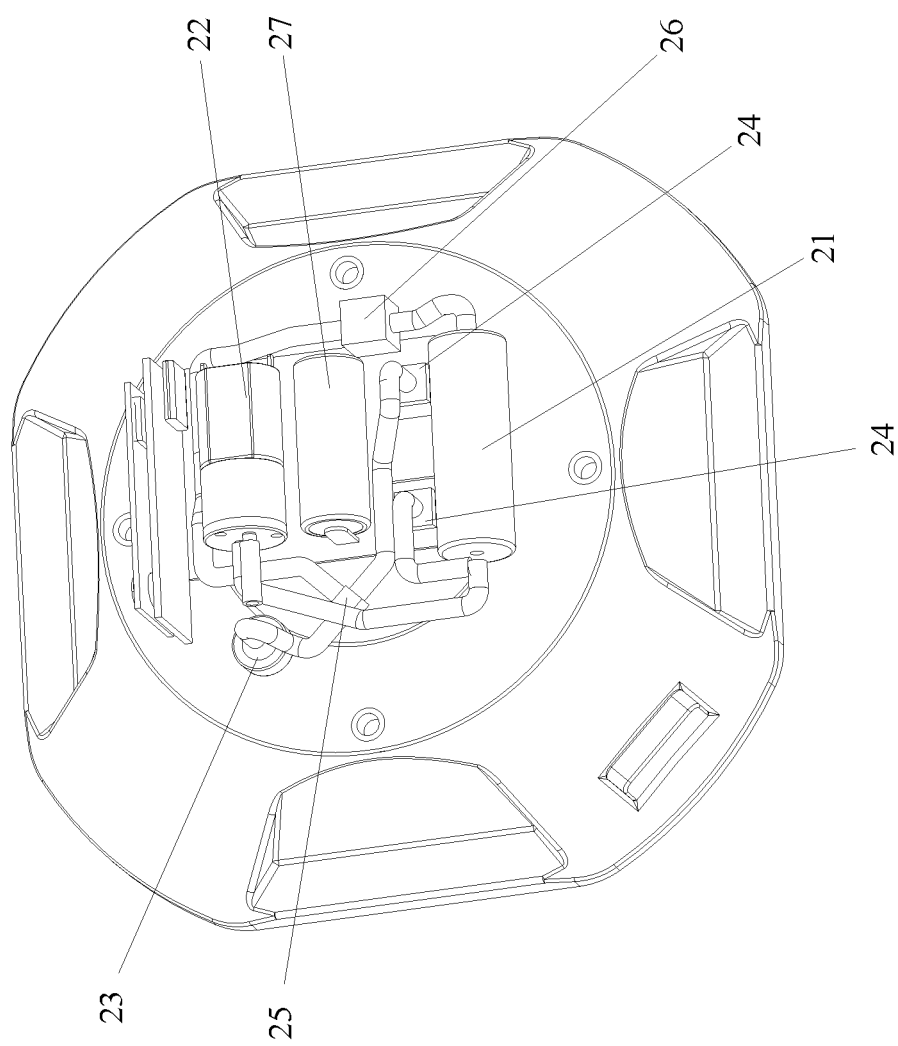
FIG. 3 is a second perspective view of the suction cup air control system of the first embodiment.

Referring to FIGS. 1-3, a first embodiment of the suction cup air control system 10 comprises a suction cup body 1 and an air control system 2 responsible for regulating the suction and adsorption of the suction cup body 1. The suction cup body 1 features an adsorption chamber 11 on one side, facilitating adsorption or adhesion to an external structure or surface. The air control system 2 is connected to the suction cup body 1. The connection can be achieved by directly integrating the air control system 2 into the suction cup body 1, where a pipe or hose connects to the adsorption chamber 11 for controlling or regulating the suction and fixation of the suction cup body 1. Alternatively, the air control system 2 can be separate from the suction cup body 1 but connected to the adsorption chamber 11 via a pipe or hose for controlling the suction and fixation of the suction cup body 1.

The air control system 2 includes a high-pressure vacuum cylinder 21 for achieving adsorption (or suction) control of the suction cup body 1 through vacuum suction, and a control pump 22 for regulating (e.g., extracting and discharging) air from the high-pressure vacuum cylinder 21. The high-pressure vacuum cylinder 21 is connected to (e.g., hermitically connected) the adsorption chamber 11 of the suction cup body 1, while the control pump 22 is connected to the high-pressure vacuum cylinder 21. In this embodiment, the high-pressure vacuum cylinder 21 is in communication with the control pump 22. The high-pressure vacuum cylinder 21 can regulate a suction generated by the suction cup body. When the control pump 22 initiates evacuation (extraction), the high-pressure vacuum cylinder 21 generates negative pressure. As the high-pressure vacuum cylinder 21 is hermitically connected to the suction cup body 1, the air in the adsorption chamber 11 can be rapidly extracted through the high-pressure vacuum cylinder 21 once the control pump 22 commences evacuation. This enables the adsorption chamber 11 of the suction cup body 1 to attain the predetermined safe negative pressure (or vacuum) range, preventing detachment of the suction cup body 1 and ensuring the stability of photographic device installation. Determining the specific safe negative pressure range for the suction cup control system of this embodiment can be accomplished through repetitive testing.

In one embodiment, the air control system 2 can incorporate a one-way valve 23, whereby the high-pressure vacuum cylinder 21 is connected to the adsorption chamber 11 of the suction cup body 1 via the one-way valve 23. This configuration ensures that when the control pump 22 ceases operation, the one-way valve 23 maintains the air pressure (or vacuum) in the adsorption chamber 11 within the safe negative pressure range.

In one embodiment, the air control system 2 includes a detection module 24 for monitoring the air pressure in the suction cup body 1. The detection module 24 is connected to the adsorption chamber 11 of the suction cup body 1, with a first detection point 241 situated at the connection between the detection module 24 and the adsorption chamber 11 to detect the air pressure in the adsorption chamber 11.

In one embodiment, the air control system 2 features a connection module, which may be a tee joint 25 for example. The detection module 24 and the high-pressure vacuum cylinder 21 can both be connected to the one-way valve 23 via the tee joint 25. In other words, the detection module 24, the high-pressure vacuum cylinder 21, and the one-way valve 23 are connected to respective ports (three ports) of the tee joint 25.

Furthermore, the gas flow (e.g., air flow) between the one-way valve 23 and the high-pressure vacuum cylinder 21 can be determined by the pressure detected at the first detection point 241. For example, the gas flow between the one-way valve 23 and the high-pressure vacuum cylinder 21 can be controlled by an electromagnetic valve 26 (e.g., a solenoid valve).

In one embodiment, the high-pressure vacuum cylinder 21 is connected to the tee joint 25 via the electromagnetic valve 26. Once the air pressure at the first detection point 241 reaches the safe negative pressure range, the control electromagnetic valve 26 closes, thereby blocking the gas flow between the one-way valve 23 and the high-pressure vacuum cylinder 21. Consequently, the adsorption chamber 11 remains within the safe negative pressure range, ensuring stable adsorption or adhesion.

In one embodiment, the detection module 24 is can be connected to the high-pressure vacuum cylinder 21, and a second detection point 242 is formed at the connection between the detection module 24 and the high-pressure vacuum cylinder 21 to detect the air pressure in the high-pressure vacuum cylinder 21.

After the electromagnetic valve 26 is closed, the control pump 22 can continue to extract and/or expel air from the high-pressure vacuum cylinder 21. When the pressure detected at the second detection point 242 reaches the maximum negative pressure value, the control pump 22 is controlled to stop working. At this point, the adsorption chamber 11 is within the safe negative pressure range, the high-pressure vacuum cylinder 21 is at the maximum negative pressure, and the control pump 22 can also stop working. Therefore, stable adsorption or adhesion of the suction cup body 1 is ensured while achieving energy savings. Additionally, if the air pressure in the adsorption chamber 11 is detected to be lower than the safe negative pressure at the first detection point 241, the control electromagnetic valve 26 is opened again. With the high-pressure vacuum cylinder 21 at the maximum negative pressure, according to the principle of pressure gradient, the air in the adsorption chamber 11 is quickly drawn into the high-pressure vacuum cylinder 21. When the air pressure at the first detection point 241 reaches the preset safe negative pressure, the control electromagnetic valve 26 is closed again. With this configuration, even if a small amount of external air accidentally enters the adsorption chamber 11 during the use of the suction cup body 1, the suction cup air control system 10 in this embodiment can ensure stable adsorption of the suction cup body 1 once again.

In one embodiment, the air control system 2 can include a power supply module 27, which is connected to the detection module 24. The power supply module 27 can be an existing power supply structure or an external power supply structure. The power supply module can support power to the air control system 2.

In one embodiment, the detection module 24 can be mounted on the control circuit board, and the control circuit board is electrically connected to various components mentioned above (e.g., control pump 22, one-way valve 23, electromagnetic valve 26, power supply module 27, etc.) to control the operations (e.g., opening or closing) of the aforementioned components. The circuit configuration of the circuit board and the specific connection and control principles between the circuit board and the above components are known in the prior art.

Specifically, the embodiment has the following effects. In one aspect, the high-pressure vacuum cylinder 21 can quickly extract air from the adsorption chamber 11 of the suction cup body 1, thus maintaining the pressure or vacuum inside the suction cup body within the safe negative pressure range to prevent detachment of the suction cup body. In one aspect, the structure and pipeline of the gas control system 2 occupy a small space, making the product relatively compact, portable, and easy to use. In one aspect, based on the structure and pipeline configuration of the air control system 2, the manufacturing cost of the product is reduced.

One embodiment of the present disclosure provides a control method for the suction cup air control system 10 described above in relation to FIGS. 1-5. The control method includes controlling the detection module 24 to detect the air pressure in the adsorption chamber 11 of the suction cup body 1.

In one aspect, when the air pressure is higher than the minimum predetermined negative pressure value, the high-pressure vacuum cylinder 21 is controlled to disconnect from the adsorption chamber 11, and the control pump 22 is controlled to extract and/or expel air from the high-pressure vacuum cylinder 21.

In one aspect, when the air pressure reaches the maximum negative pressure value, the control pump 22 is controlled to close and stop extracting air from the high-pressure vacuum cylinder 21.

In one aspect, when the air pressure in the adsorption chamber 11 of the suction cup body 1 is higher than the minimum predetermined negative pressure value, specifically: close the electromagnetic valve 26 and control the control pump 22 to extract air from the high-pressure vacuum cylinder 21, thereby preparing the high-pressure vacuum cylinder 21 for the next operation.

In one embodiment, the suction cup air control system 10 can include a connecting bracket 5. One end of the connecting bracket 5 can be detachably connected to the suction cup body 1 to form a housing space (e.g., a containment space) for accommodating the air control system 2 between the connecting bracket 5 and the suction cup body 1.

Figure 4:
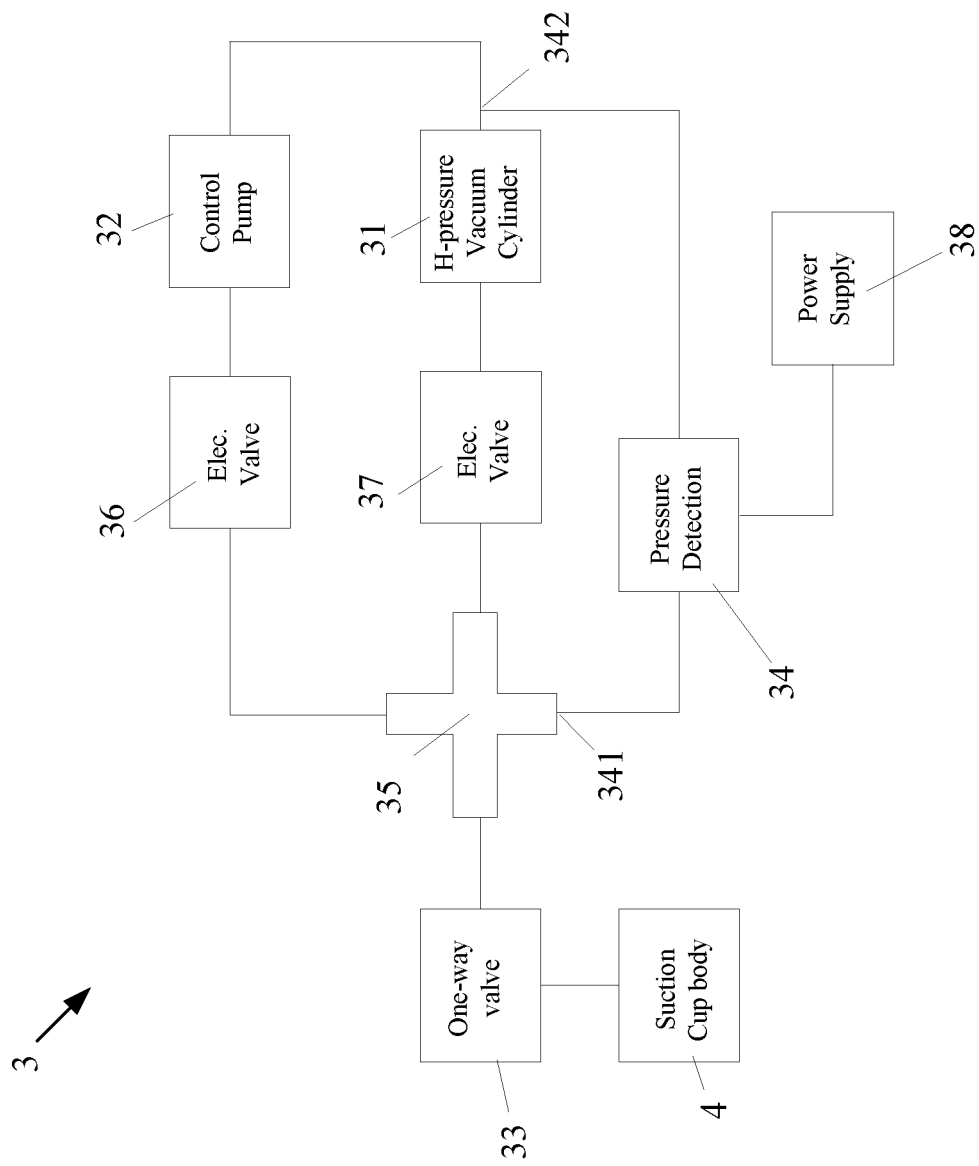
FIG. 4 is a diagram of a suction cup air control system according to a second embodiment of the present disclosure.
Figure 5:
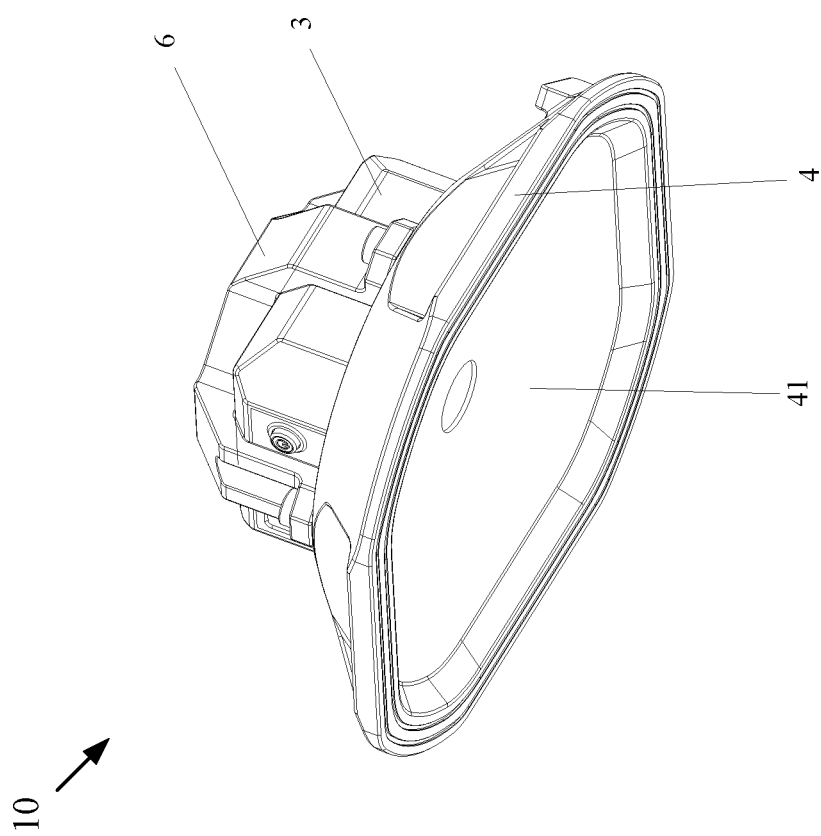
FIG. 5 is a diagram of the suction cup air control system of the second embodiment.

Referring to FIGS. 4-5, a second embodiment of the suction cup air control system 10 is provided. The suction cup air control system 10 includes a suction cup body 4 and an air control system 3 for controlling the adsorption or adhesion of the suction cup body 4. One side of the suction cup body 4 includes an adsorption chamber 41 for adhering to an external structure or surface, and the air control system 3 is connected (e.g., hermetically connected) to the suction cup body 4. The connection can be directly fixed to the suction cup body 4 for integration and connected to the adsorption chamber 41 via a pipeline or hose to control the absorption and fixation of the suction cup body 4. The air control system 3 includes a high-pressure vacuum cylinder 31 for controlling the suction cup body 4 through vacuum suction and a control pump 32 for extracting and discharging air from the high-pressure vacuum cylinder 31. The high-pressure vacuum cylinder 31 and the control pump 32 are connected to the adsorption chamber 41 of the suction cup body 4, and the control pump 32 is connected to the high-pressure vacuum cylinder 31.

In one embodiment, the air control system 3 incorporates a one-way valve 33 between the high-pressure vacuum cylinder 31 and the adsorption chamber 41 of the suction cup body 4. With this configuration, when the control pump 22 stops working, the one-way valve 23 can ensure that the air pressure in the adsorption chamber 41 remains within the safe negative pressure range.

In one embodiment, the air control system 3 can comprise a pressure detection module 34 for measuring the air pressure within the suction cup body 4. The pressure detection module 34 is connected to (hermetically) the adsorption chamber 41 of the suction cup body 4, and a first pressure detection point 341 is arranged at the junction between the pressure detection module 34 and the adsorption chamber 41 of the suction cup body 4 to measure the air pressure.

In one embodiment, the air control system 3 can include a connection module, which can be a four-way joint 35. The pressure detection module 34, control pump 32, and high-pressure vacuum cylinder 31 can be connected to the one-way valve 33 via the four-way joint 35. This means that the pressure detection module 34, high-pressure vacuum cylinder 31, control pump 32, and one-way valve 33 are connected to the four ports of the four-way joint 35. In this embodiment, the flow of air between the one-way valve 33 and the control pump 32, as well as between the one-way valve 33 and the high-pressure vacuum cylinder 31, can be determined by the pressure measurement at the first pressure detection point 341.

Specifically, in this embodiment, the high-pressure vacuum cylinder 31 is connected to the four-way joint 35 through a second electromagnetic valve 37. The control pump 32 is connected to the four-way joint 35 via a first electromagnetic valve 36. When the air pressure at the first pressure detection point 341 reaches the safe negative pressure range, both the first electromagnetic valve 36 and the second electromagnetic valve 37 (e.g., a solenoid valve) are closed. At this point, the adsorption chamber 41 maintains a safe negative pressure, ensuring stable adsorption. Additionally, in this embodiment, the pressure detection module 34 is connected to the high-pressure vacuum cylinder 31, forming a second pressure detection point 342 at the junction between the pressure detection module 34 and the high-pressure vacuum cylinder 31. When both the first electromagnetic valve 36 and the second electromagnetic valve 37 are closed, the control pump 32 can continue to extract and/or expel air from the high-pressure vacuum cylinder 31. When the detected air pressure at the second pressure detection point 342 reaches the maximum negative pressure value, the control pump 32 ceases operation. At this stage, the adsorption chamber 41 remains within the predetermined safe negative pressure range, while the high-pressure vacuum cylinder 31 reaches the maximum negative pressure value, allowing the control pump 32 to stop working. This achieves both stable adsorption of the suction cup body 4 and energy savings. Moreover, if the first pressure detection point 341 detects that the air pressure in the adsorption chamber 41 falls below the safe negative pressure, the second electromagnetic valve 37 is restarted (i.e., opened). By utilizing the pressure gradient principle and taking advantage of the maximum negative pressure in the high-pressure vacuum cylinder 31, the air within the adsorption chamber 41 is quickly drawn into the high-pressure vacuum cylinder 31. If the first pressure detection point 341 detects that the air pressure reaches the preset safe negative pressure, the second electromagnetic valve 37 is closed once again. This configuration ensures that even if a small amount of external air accidentally enters the adsorption chamber 41 during the use of the suction cup body 4, the suction cup air control system in this embodiment can once again guarantee stable adsorption of the suction cup body 4.

Additionally, in this embodiment, the air control system 3 includes a power supply module 38, which can be connected to the pressure detection module 34. The power supply module 38 can supply power to the air control system 3.

The pressure detection module 34 can be mounted on a control circuit board, which is electrically connected to the various components of the air control system 3 (control pump 32, one-way valve 33, electromagnetic valves 36 and 37, power supply module 38, etc.) to control the operation of these components. The specific circuit configuration of the control circuit board, as well as the connections and control principles between the circuit board and the various components of the air control system 3, are known in the art.

When the air pressure falls below the preset safe negative pressure, the control system opens both the first electromagnetic valve and the second electromagnetic valve 37. This allows the high-pressure vacuum cylinder 31 to extract air from the adsorption chamber 41 of the suction cup body 4. The air passes through the one-way valve 33, the four-way joint 35, the second electromagnetic valve 37, and enters the high-pressure vacuum cylinder 31. It is then further exhausted through the exhaust pipe of the control pump 32.

In this embodiment, specifically, the air is discharged through two pipelines and two electromagnetic valves, enhancing the efficiency of air extraction and enabling the suction cup body to achieve instant or quick adsorption/adhesion and prevent detachment.

One embodiment provides a control method for the suction cup air control system described above. The control method includes controlling the detection module 34 to measure the air pressure in the adsorption chamber 41 of the suction cup body 4.

In one aspect, when the air pressure exceeds the minimum predetermined negative pressure value, both the control pump 32 and the high-pressure vacuum cylinder 31 are disconnected (e.g., by closing the valves 36 and 37) from the adsorption chamber 41. Then, the control pump 32 can extract and/or expel air from the high-pressure vacuum cylinder 31.

In one aspect, when the air pressure reaches the maximum negative pressure value, the control pump 32 is controlled to close and stop extracting air from the high-pressure vacuum cylinder 31.

Specifically, when the air pressure in the adsorption chamber 41 of the suction cup body 4 is higher than the minimum predetermined negative pressure value, both the first electromagnetic valve 36 and the second electromagnetic valve 37 are closed. Due to the one-way flow characteristic of the one-way valve 33, the negative pressure in the adsorption chamber 41 of the suction cup body 4 is maintained within the preset safe range. Meanwhile, the control pump 32 extracts air from the high-pressure vacuum cylinder 31, preparing it for the next operation and ensuring the continuous operation of the suction cup body 4.

In one embodiment, the suction cup air control system 10 can include a connecting bracket 6. One end of the connecting bracket 6 can be detachably connected to the suction cup body 4, creating a housing space to accommodate the air control system 3.

Figure 6:
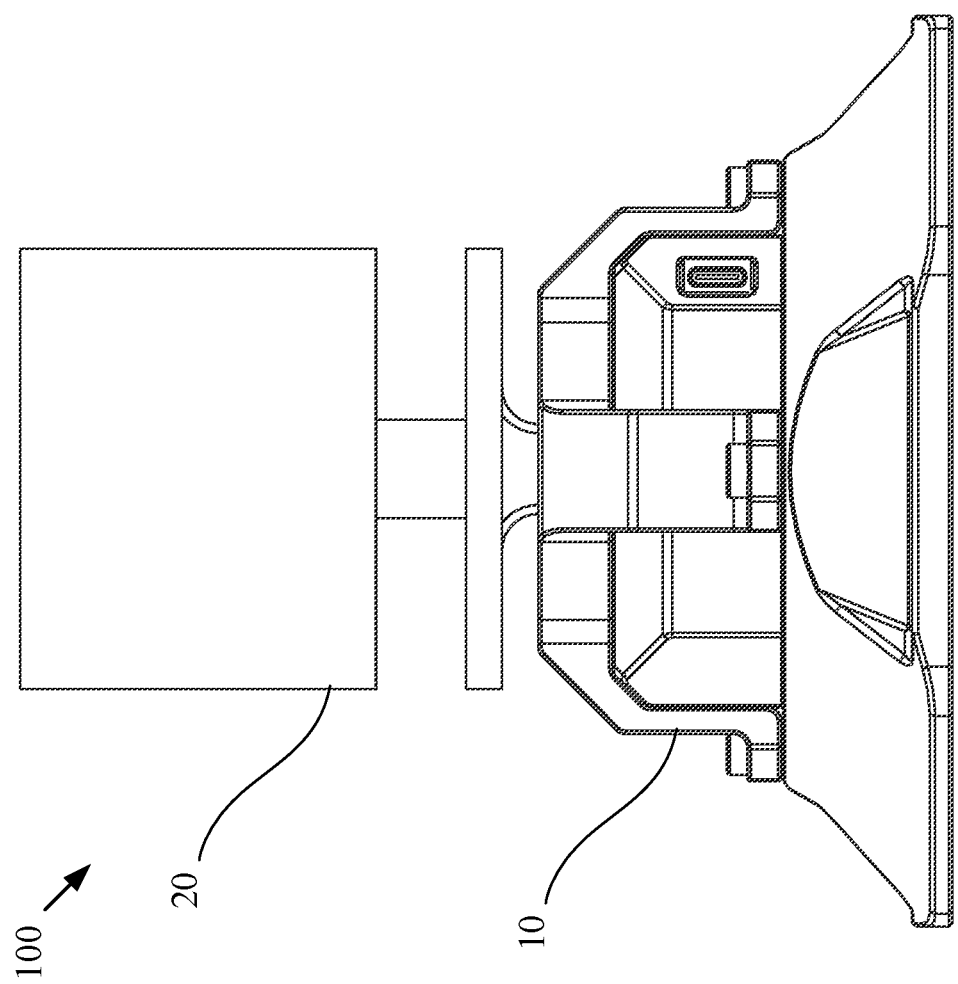
FIG. 6 is a diagram of a photographic device according to an embodiment.

In one embodiment, a photographic device 100, referring to FIG. 6, includes a photographic device body 20 and either one of the two embodiments of the suction cup air control system 10 mentioned above. For example, the photographic device body can be fixed to the suction cup body 4. In one example, the photographic device 100 can be a camera.

In one embodiment, the suction cup air control system 10 is fixedly arranged on the suction cup body 4, integrating them as a whole.

Specifically, the aforementioned high-pressure vacuum cylinder is a prior art, essentially equivalent to a vacuum pump connected to a large-volume air storage tank, enabling rapid air extraction. The control pump can be selected as a vacuum pump.

The above description represents a preferred embodiment of the present disclosure and should not be construed as limiting the scope thereof. Any modifications, equivalent replacements, or improvements made within the spirit and principles of the present disclosure should be included within its scope.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A suction cup air control apparatus, comprising:
   a suction cup body; and
   an air control system comprising:
   a high-pressure vacuum cylinder configured to regulate a suction generated by the suction cup body;
   a connection module, wherein the high-pressure vacuum cylinder is connected to the suction cup body through the connection module;
   a one-way valve, wherein the high-pressure vacuum cylinder is connected to the suction cup body through the one-way valve;
   a detection module, wherein the detection module is connected to the connection module; and
   a control pump connected to the high-pressure vacuum cylinder, the control pump being configured to extract air from the high-pressure vacuum cylinder,
   wherein the high-pressure vacuum cylinder is configured to disconnect from the suction cup body in response to the detection module detecting that the suction cup body reaches a predetermined negative pressure value.

2. The suction cup air control apparatus according to claim 1, further comprising:
   a connection module, wherein the high-pressure vacuum cylinder is connected to the suction cup body through the connection module.

3. The suction cup air control apparatus according to claim 2, wherein both the control pump and the high-pressure vacuum cylinder are connected to the suction cup body through the connection module.

4. The suction cup air control apparatus according to claim 2, wherein the high-pressure vacuum cylinder is connected to the connection module via a first solenoid valve.

5. The suction cup air control apparatus according to claim 4, wherein both the control pump and the connection module are connected via the first solenoid valve, and the high-pressure vacuum cylinder and the connection module are connected via a second solenoid valve.

6. The suction cup air control apparatus according to claim 2, further comprising:
   a detection module, wherein the detection module is connected to the connection module, and a first detection point for measuring an air pressure inside the suction cup body is formed at a connection between the detection module and the connection module.

7. The suction cup air control apparatus according to claim 6, wherein the detection module is further connected to the high-pressure vacuum cylinder, and a second detection point for measuring an air pressure inside the high-pressure vacuum cylinder is formed at a connection between the detection module and the high-pressure vacuum cylinder.

8. The suction cup air control apparatus according to claim 1, further comprising:
   a one-way valve, wherein the high-pressure vacuum cylinder is connected to the suction cup body through the one-way valve.

9. The suction cup air control apparatus according to claim 1, further comprising:
   a power supply module, wherein the control pump is electrically connected to the power supply module.

10. The suction cup air control apparatus according to claim 1, further comprising:
    a connecting bracket, wherein a first end of the connecting bracket is detachably connected to the suction cup body, thereby creating a containment space for accommodating the air control system therein.

11. A photography device comprising the suction cup air control apparatus according to claim 1.

* * * * *